United States Patent
Inohiza

(10) Patent No.: US 11,917,676 B2
(45) Date of Patent: Feb. 27, 2024

(54) COMMUNICATION APPARATUS, COMMUNICATION METHOD, AND STORAGE MEDIUM

(71) Applicant: CANON KABUSHIKI KAISHA, Tokyo (JP)

(72) Inventor: Hirohiko Inohiza, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 277 days.

(21) Appl. No.: 17/308,808

(22) Filed: May 5, 2021

(65) Prior Publication Data
US 2021/0258983 A1 Aug. 19, 2021

Related U.S. Application Data

(63) Continuation of application No. PCT/JP2019/041601, filed on Oct. 24, 2019.

(30) Foreign Application Priority Data

Nov. 8, 2018 (JP) .................................. 2018-210843

(51) Int. Cl.
H04W 72/566 (2023.01)
H04W 76/11 (2018.01)
H04W 52/02 (2009.01)

(52) U.S. Cl.
CPC ..... *H04W 72/566* (2023.01); *H04W 52/0225* (2013.01); *H04W 74/0808* (2013.01); *H04W 76/11* (2018.02)

(58) Field of Classification Search
CPC ........... H04W 72/566; H04W 52/0225; H04W 74/0808; H04W 76/11; H04W 74/0875;
(Continued)

(56) References Cited

U.S. PATENT DOCUMENTS

| 2009/0180414 A1* | 7/2009 | Maeda | H04W 52/0216 370/311 |
| 2011/0158206 A1* | 6/2011 | Shrestha | G01D 21/00 370/336 |

(Continued)

FOREIGN PATENT DOCUMENTS

| JP | 2010-57072 A | 3/2010 |
| WO | 2018/038532 A1 | 3/2018 |
| WO | 2018038532 A1 | 3/2018 |

OTHER PUBLICATIONS

Shin et al., "Balancing Uplink and Downlink Delay of VoIP Traffic in WLANs using Adaptive Priority Control (APC)", Aug. 2006, QShine '06: Proceedings of the 3rd international conference on Quality of service in heterogeneous wired/wireless networks, pp. 1-8 (Year: 2006).*

(Continued)

*Primary Examiner* — Michael K Phillips
(74) *Attorney, Agent, or Firm* — Canon U.S.A., Inc. IP Division

(57) ABSTRACT

A communication apparatus transmits a request signal to an apparatus operating in a second operation mode among operation modes including a first operation mode using a first wireless communication unit and the second operation mode using a second wireless communication unit operable with lower power consumption than the first wireless communication unit. The request signal for causes the apparatus to transition from the second operation mode to the first operation mode. The communication apparatus determines whether transmitting the request signal is prioritized, and decides a parameter in the request signal that is used to avoid an access conflict in a wireless communication band, based on a result of the decision.

6 Claims, 8 Drawing Sheets

(58) Field of Classification Search
CPC ..... H04W 76/27; H04W 84/12; H04W 52/02; Y02D 30/70
See application file for complete search history.

(56) References Cited

U.S. PATENT DOCUMENTS

| | | | |
|---|---|---|---|
| 2018/0255514 A1 | 9/2018 | Sun et al. | |
| 2019/0191376 A1* | 6/2019 | Kim | H04W 52/0229 |
| 2019/0357143 A1* | 11/2019 | Wang | H04W 52/0229 |
| 2020/0120605 A1* | 4/2020 | Tomeba | H04W 52/02 |
| 2020/0322889 A1* | 10/2020 | Chitrakar | H04W 52/0235 |

OTHER PUBLICATIONS

Langendeon et al., "An Adaptive Energy-Efficient MAC Protocol for Wireless Sensor Networks", Nov. 5-7, 2003, SenSys'03, pp. 171-180 (Year: 2003).*

Ming Gan, et al., Bss parameters update notification follow up, IEEE 802.11-18/0437r4, Mar. 2018 (URL: https://mentor.ieee.org/802.11/dcn/18/11-18-0437-04-00ba-bss-parameters-update-notification-follow-up.pptx), slide 3.

Po-Kai Huang, et. al., WUR negotiation and acknoledgement procedure follow up, IEEE 802.11-17/0342r4, Mar. 2017, (URL: https://mentor.ieee.org/802.11/dcn/17/11-17-0342-04-00ba-wur-negotiation-and-acknowledgement-procedure-follow-up.pptx), pp. 8, 9.

Ming Gan et al.; (Huawei Technologies, Co. Ltd.); BSS parameters update notification follow up; IEEE 802.11-18/0437 r4; URL:https://mentor.ieee.org/802.11/dcn/18/11-18-0437-04-00ba-bss-parameters-update-notification-follow-up.pptx>; May 10, 2018; pp. 1-14.

* cited by examiner

FIG.4

| ACI | AC | AIFSN | CWmin | CWmax |
|---|---|---|---|---|
| 0 | AC_BE | 7 | 15 | 1023 |
| 1 | AC_BK | 3 | 15 | 1023 |
| 2 | AC_VI | 2 | 7 | 15 |
| 3 | AC_VO | 2 | 3 | 7 |

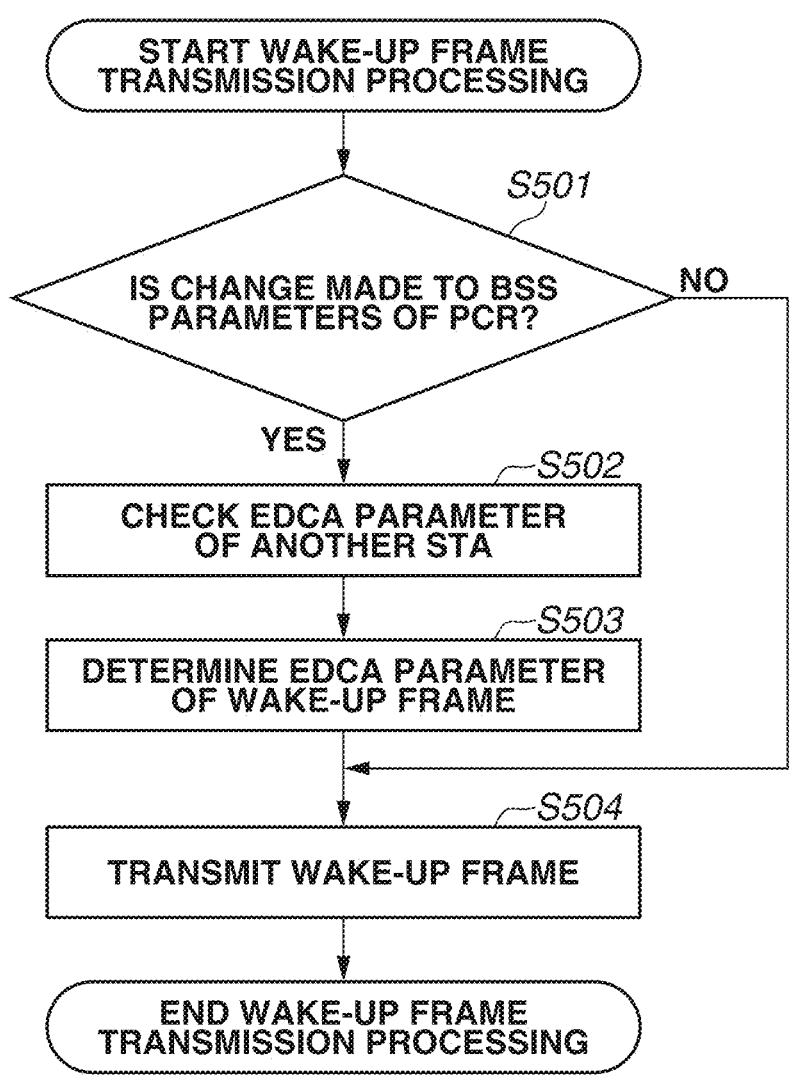

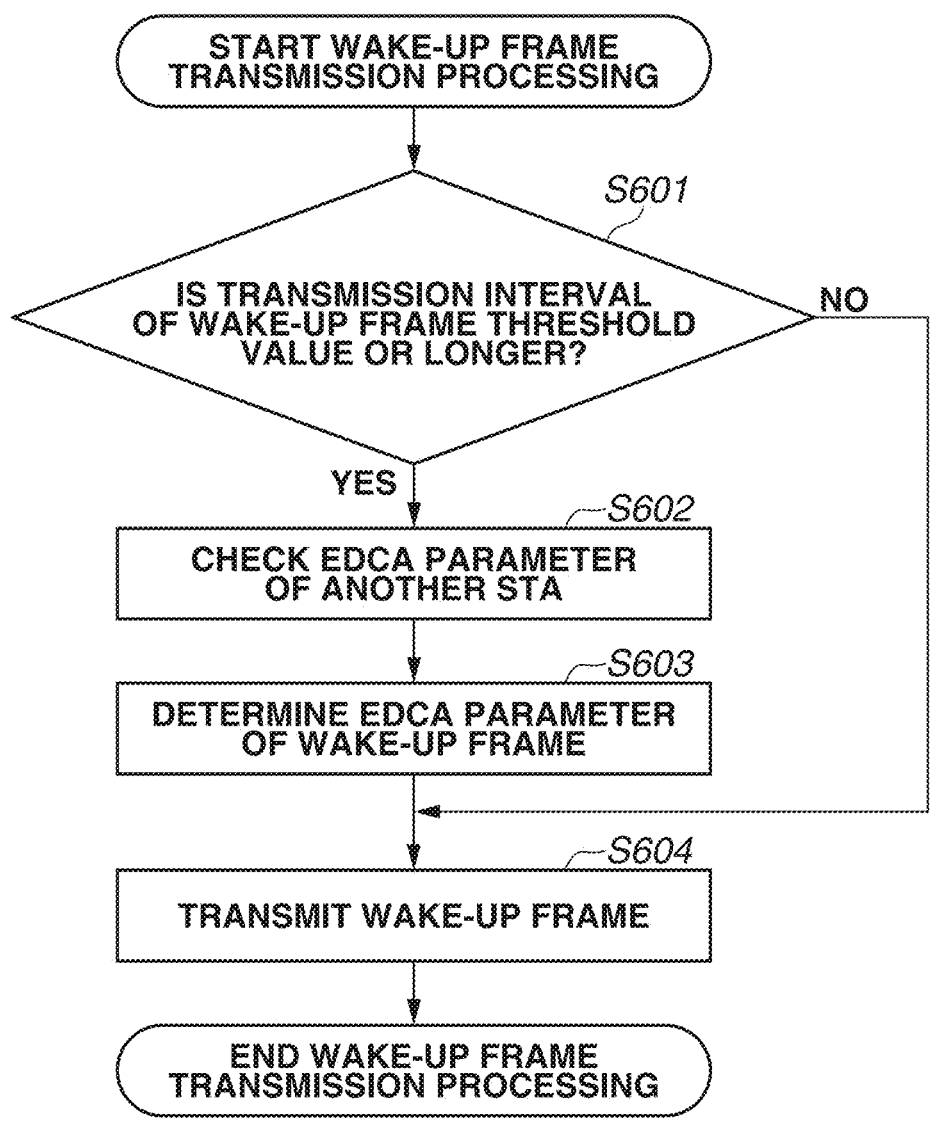

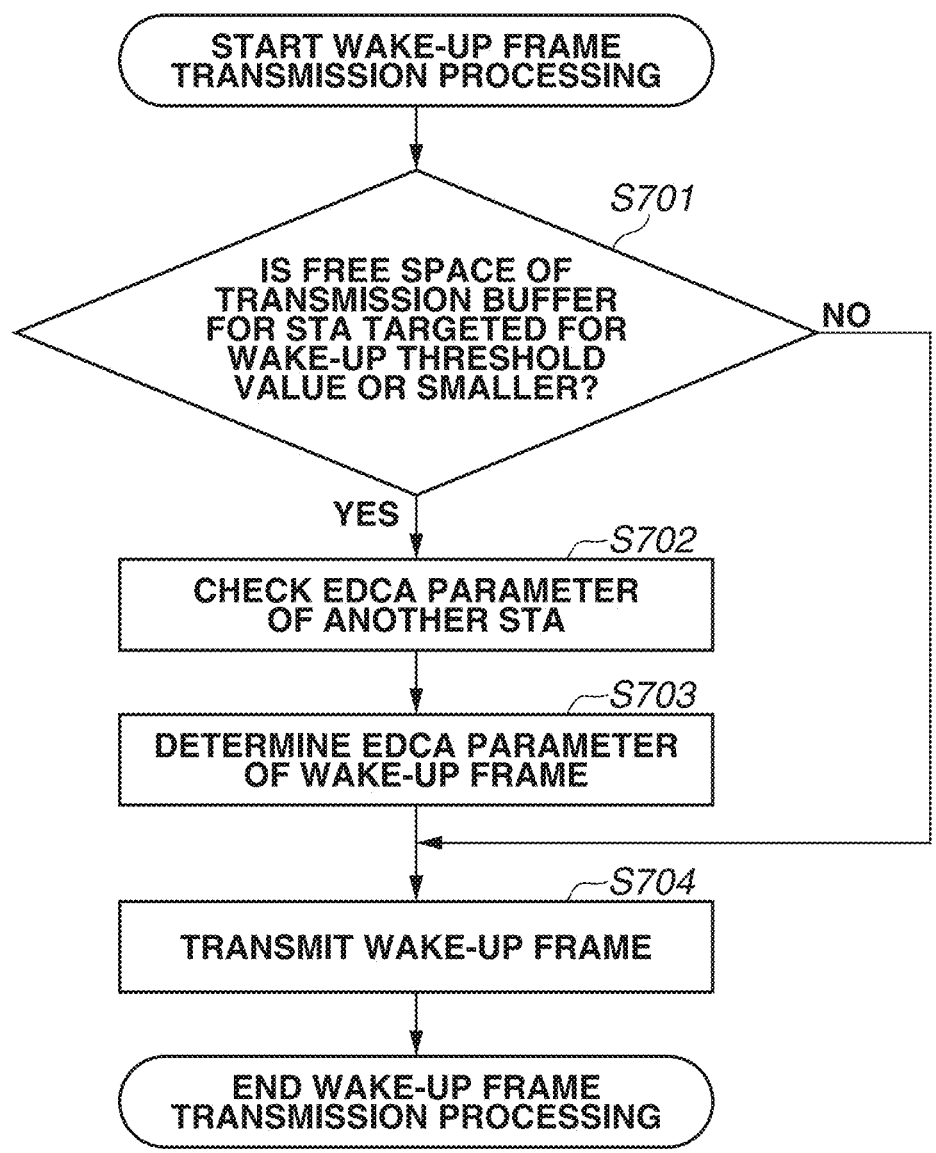

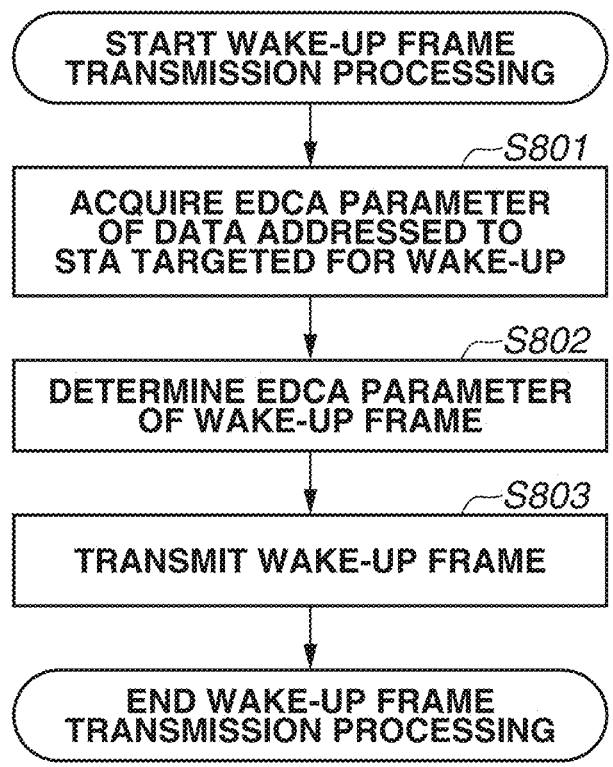

COMMUNICATION APPARATUS, COMMUNICATION METHOD, AND STORAGE MEDIUM

CROSS-REFERENCE TO RELATED APPLICATIONS

This application is a Continuation of International Patent Application No. PCT/JP2019/041601, filed Oct. 24, 2019, which claims the benefit of Japanese Patent Application No. 2018-210843, filed Nov. 8, 2018, both of which are hereby incorporated by reference herein in their entirety.

BACKGROUND OF THE INVENTION

Field of the Invention

The present invention relates to a communication apparatus, a communication method, and a storage medium.

Background Art

Apparatuses equipped with a wireless communication function have been diversified, and this has led to a demand for realizing wireless communication with low power consumption especially toward battery-driven devices and embedded devices designed for Internet of Things (IoT). In light thereof, the Institute of Electrical and Electronics Engineers (IEEE) 802.11 standards have formulated specifications defining a transition to a power-saving (Power Save) mode during absence of communication by the wireless communication function in a wireless local area network (LAN). The IEEE has been considering the IEEE 802.11ba standards to further improve the power-saving performance. According to the IEEE 802.11ba standards, a Wake Up Radio (WUR) is provided in addition to a Primary Connectivity Radio (PCR), which is a conventional Radio Frequency (RF) circuit, to improve the power-saving performance. The WUR can operate with lower power consumption than the PCR, and allows the power saving performance to be further improved by bringing the PCR into a Doze state when the PCR is not carrying out communication. A WUR mode refers to a state that only the WUR is in operation while the PCR is kept in the Doze state and a Wake-up mode refers to a state that the PCR is started up. Patent Literature 1 (PTL1) discusses a method for causing the PCR and WUR to operate in different channels.

According to the IEEE 802.11ba standards, when an access point (hereinafter referred to as an AP) holds data addressed to a station (hereinafter referred to as an STA) operating in the WUR mode, the AP transmits a Wake-up frame to the STA operating in the WUR mode, to cause the STA to transition to the Wake-up mode. After that, the AP transmits the data to the STA operating in the Wake-up mode.

CITATION LIST

Patent Literature

PTL 1: United States Patent Application Publication No. 2018/0255514

According to the IEEE 802.11ba standards, the Enhanced Distributed Channel Access (EDCA) method can be employed as a media access method when the Wake-up frame is transmitted. However, if the EDCA parameter of the Wake-up frame is not appropriately set, transmission of a wireless frame of another STA operating in the Wake-up mode may be prioritized, and thus a delay can occur in the transmission of the Wake-up frame. This results in an undesirable delay in transition of the STA operating in the WUR mode to the Wake-up mode. As a result, for example, a delay may occur in transmission of high-priority data that should be transmitted to the STA, or overflow of a buffer for transmission data in the AP may occur because the AP misses a data transmission chance.

SUMMARY OF THE INVENTION

The present invention has been made in consideration of the above-described issue, and is directed to allowing a signal for causing a communication apparatus to transition to a state for receiving data to be transmitted at a further appropriate timing.

According to an aspect of the present invention, a communication apparatus includes a transmission unit configured to transmit a request signal to an apparatus operating in a second operation mode among a plurality of operation modes including a first operation mode and the second operation mode, the first operation mode using a first wireless communication unit, the second operation mode not using the first wireless communication unit and using a second wireless communication unit operable with lower power consumption than the first wireless communication unit, the request signal causing the apparatus to transition from the second operation mode to the first operation mode, a determination unit configured to determine whether transmitting the request signal is prioritized, and a decision unit configured to decide a parameter in the request signal, based on a result of the determination by the determination unit, the parameter being used to avoid an access conflict in a wireless communication band, wherein the transmission unit transmits the request signal, based on the parameter decided by the decision unit.

According to an aspect of the present invention, a communication apparatus includes a transmission unit configured to transmit a request signal to an apparatus operating in a second operation mode among a plurality of operation modes including a first operation mode and the second operation mode, the first operation mode using a first wireless communication unit, the second operation mode not using the first wireless communication unit and using a second wireless communication unit operable with lower power consumption than the first wireless communication unit, the request signal causing the apparatus to transition from the second operation mode to the first operation mode, and a decision unit configured to decide a parameter in the request signal that is used to avoid an access conflict in a wireless communication band, based on data that is to be transmitted in the first operation mode after the request signal is transmitted, wherein the transmission unit transmits the request signal, based on the parameter decided by the decision unit.

Further features of the present invention will become apparent from the following description of exemplary embodiments with reference to the attached drawings.

BRIEF DESCRIPTION OF THE DRAWINGS

FIG. 4 is a diagram illustrating examples of Enhanced Distributed Channel Access (EDCA) parameters held by an access point (AP).

FIG. 5 is a flowchart illustrating a first example of Wake-up frame transmission processing.

FIG. 6 is a flowchart illustrating a second example of Wake-up frame transmission processing.

FIG. 7 is a flowchart illustrating a third example of Wake-up frame transmission processing.

FIG. 8 is a flowchart illustrating a fourth example of Wake-up frame transmission processing.

DESCRIPTION OF THE EMBODIMENTS

In the following description, an exemplary embodiment of the present invention will be described with reference to the drawings. In the following description, the present exemplary embodiment will be described taking a case where each communication apparatus is a communication apparatus having a communication function for a wireless local area network (LAN) in compliance with the Institute of Electrical and Electronics Engineers (IEEE) 802.11 standard series, as an example, but is not limited thereto. In other words, terminology corresponding to a predetermined standard will be used in each of the following descriptions, but each of the following discussions is also applicable to similar kinds of other standards.

Figure 1:
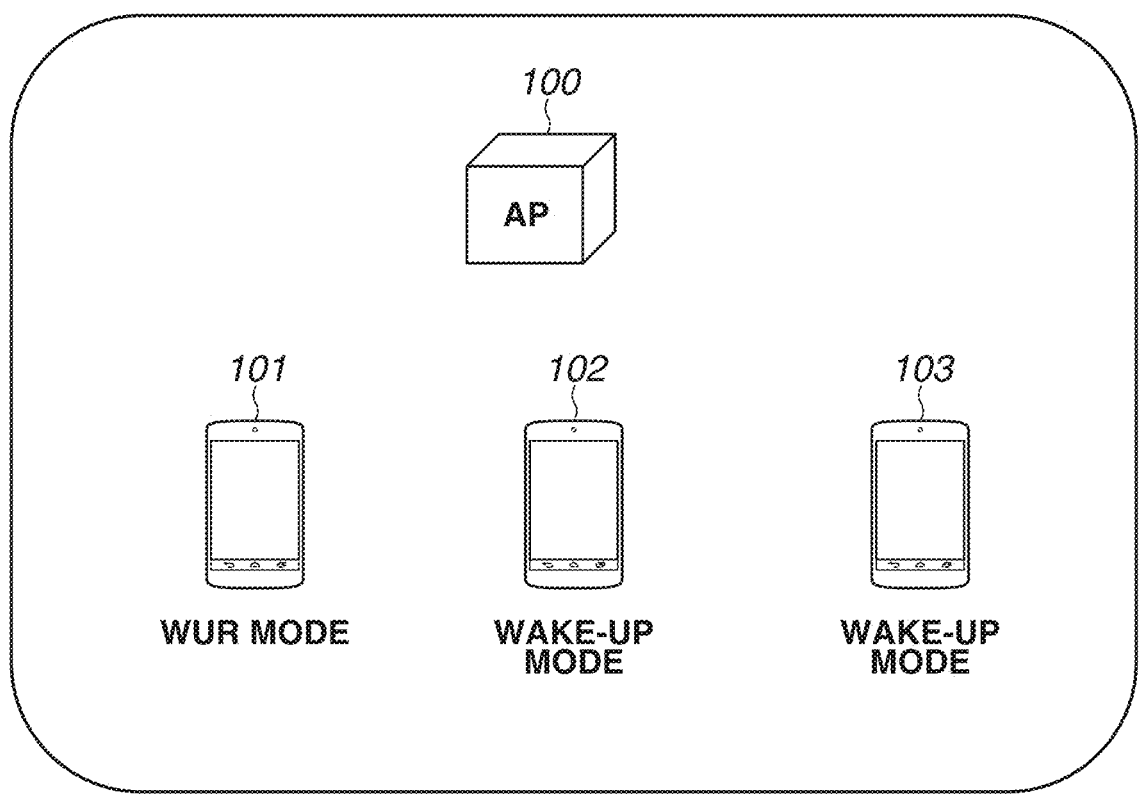
FIG. 1 is a diagram illustrating an example of a system configuration.

FIG. 1 is a diagram illustrating the configuration of a network system according to the present exemplary embodiment. Stations (STAs) 101 to 103 of a wireless LAN are connected to an access point (AP) 100 via a wireless LAN in compliance with the IEEE 802.11 standards. In the example illustrated in FIG. 1, the STA 101 is in operation in a Wake Up Radio (WUR) mode in compliance with the IEEE 802.11ba standards, and transitions to a Wake-up mode upon receiving a Wake-up frame transmitted from the AP 100. The STAs 102 and 103 are in operation in the Wake-up mode, and are set in a state in which media access according to the Enhanced Distributed Channel Access (EDCA) method is enabled in a case where the STAs 102 and 103 hold data targeted for transmission. The AP 100 is a communication apparatus, and may be various kinds of communication apparatuses, such as a smart-phone, a digital camera, and a printer having an AP function, and not being limited to an AP dedicated apparatus, such as a wireless LAN router. Similarly, the STAs 101 to 103 are also communication apparatuses, and may be various kinds of communication apparatuses, such as a smart-phone, a digital camera, and a printer.

Figure 2:
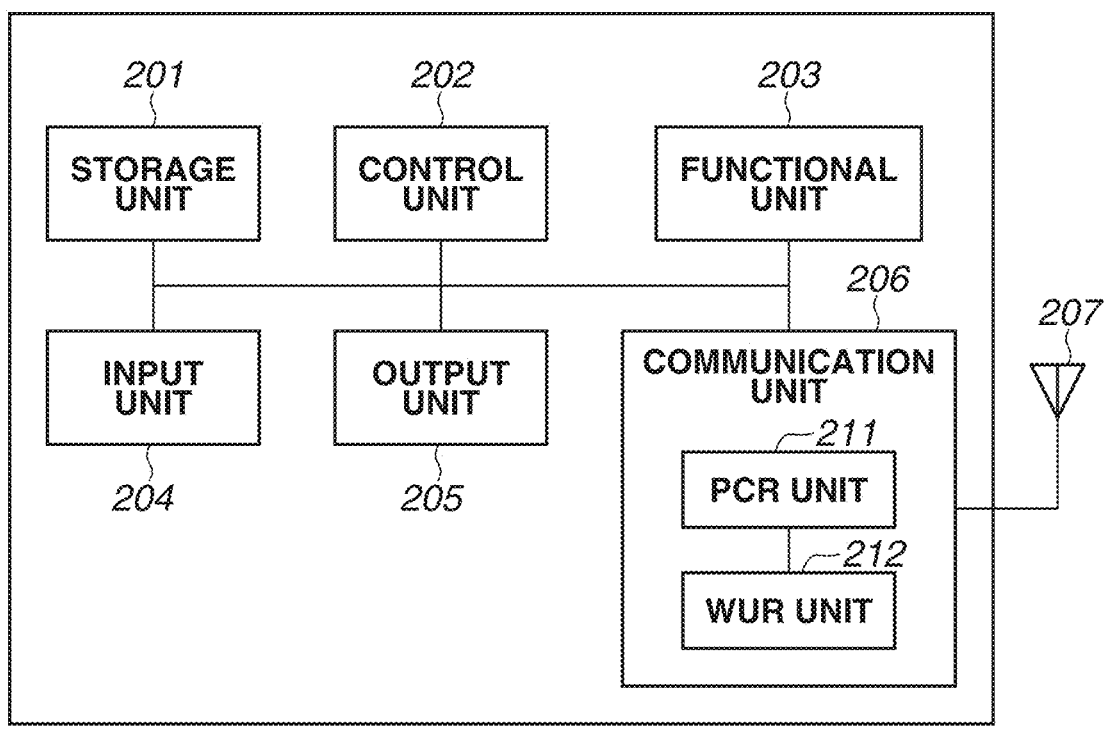
FIG. 2 is a diagram illustrating an example of the hardware configuration of a communication apparatus.

FIG. 2 is a diagram illustrating a hardware configuration of the communication apparatus according to the present exemplary embodiment. Any of the AP 100 and the STAs 101 to 103 illustrated in FIG. 1 has the hardware configuration illustrated in FIG. 2.

A storage unit 201 includes one or more memories, such as a read only memory (ROM) and a random access memory (RAM), and stores therein a program for performing various kinds of operations that will be described below and various kinds of information, such as a communication parameter for wireless communication. Examples usable as the storage unit 201 include storage media, such as a flexible disk, a hard disk, an optical disk, a magneto-optical disk, a compact disk (CD)-ROM, a CD recordable (CD-R), a magnetic tape, a nonvolatile memory card, and a digital versatile disk (DVD), besides the memory such as the ROM and the RAM.

A control unit 202 includes a processor, such as a central processing unit (CPU) and a micro processing unit (MPU), and controls the communication apparatus by executing the program stored in the storage unit 201. The control unit 202 may be configured to control the STA based on a cooperation between the computer program stored in the storage unit 201 and an operating system (OS). Alternatively, the control unit 202 may include a plurality of processors, such as a multi-core processor, and be configured to control the STA thereby.

Further, the control unit 202 performs predetermined processing, such as a STA function, the AP function, imaging, printing, and projection, by controlling a functional unit 203. The functional unit 203 is hardware that is used for the communication apparatus to perform the predetermined processing, and is, for example, an imaging unit if the communication apparatus is a digital camera, a printing unit if the communication apparatus is a printer, and a public wireless communication unit if the communication apparatus is a smart-phone.

An input unit 204 receives various kinds of operations from a user. An output unit 205 performs various kinds of outputs to the user. The outputs by the output unit 205 include at least one of a display onto the screen, an audio output by the speaker, an output of a vibration, and the like. The input unit 204 and the output unit 205 can be configured as one module, like a touch panel.

A communication unit 206 transmits and receives a wireless signal for wireless communication by controlling an antenna 207.

Further, the communication unit 206 includes a Primary Connectivity Radio (PCR) unit 211 and a WUR unit 212. The PCR unit 211 controls wireless communication in compliance with the IEEE 802.11 standards or Wireless Fidelity (Wi-Fi) and controls Internet Protocol (IP) communication. Further, the WUR unit 212 transmits or receives a WUR Beacon and a Wake-up frame when the WUR mode in compliance with the IEEE 802.11ba standards is started. The communication apparatus transmits the WUR Beacon and the Wake-up frame in a case where the communication apparatus is the AP 100, and receives the WUR Beacon and the Wake-up frame in a case where the communication apparatus is the STA. The WUR unit 212 has a function of causing the communication apparatus to operate in the Wake-up mode by ending the WUR mode and starting up the PCR unit 211 when receiving the Wake-up frame. During the WUR mode, the PCR unit 211 stops the transmission/reception function for power saving, which means that the WUR unit 212 is in charge of the function of the communication unit 206 alone. The communication apparatus includes a not-illustrated power source unit, and supplies power to the PCR unit 211 while operating in the Wake-up mode. Alternatively, the communication apparatus may be configured to stop the power supply to the PCR unit 211 and supply power to the WUR unit 212 while operating in the WUR mode. The communication apparatus transitions from the Wake-up mode to the WUR mode when no data is transmitted/received via the wireless LAN for a predetermined period or when an instruction is received from the user via the input unit 204 while the communication apparatus is operating in the Wake-up mode. The PCR unit 211 and the WUR unit 212 are configured as individually independent radio frequency (RF) circuits. However, the PCR unit 211 and the WUR unit 212 are not limited thereto, and may be configured as an integrated RF circuit. In this case, the communication apparatus enables a function serving as the PCR unit 211 when setting the PCR into an Awake state. Meanwhile, the communication apparatus disables a function serving as the PCR unit 211 when setting the PCR into a Doze state. The communication apparatus also performs similar control regarding the WUR. The RF circuit in which the PCR unit 211 and the WUR unit 212 are integrated operates with lower power consumption when the function serving as the WUR unit 212 is enabled than in a case where the function serving as the PCR unit 211 is enabled. In other words, in the case where the PCR unit 211 and the WUR unit 212 are configured as the integrated RF circuit, the RF circuit itself serves as the PCR unit 211 when the function serving as the PCR unit 211 is enabled. Meanwhile, in the case where the PCR unit 211 and the WUR unit 212 are configured as the integrated RF circuit, the RF circuit itself serves as the WUR unit 212 when the function serving as the WUR unit 212 is enabled.

Figure 3:
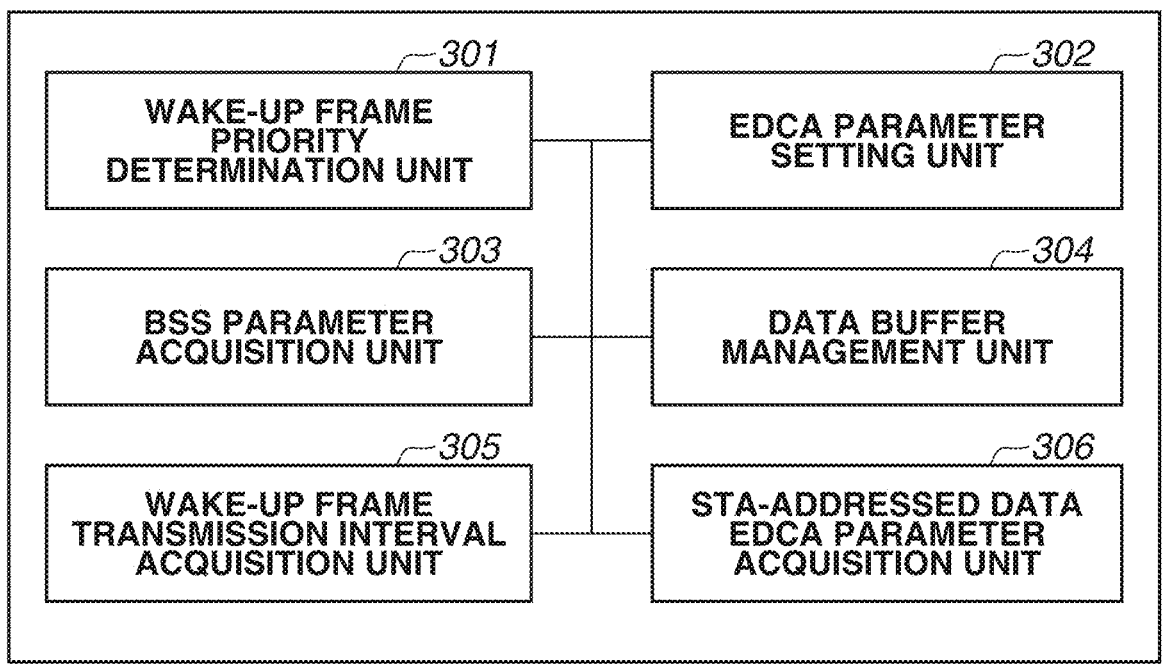
FIG. 3 is a diagram illustrating an example of the functional block configuration of the communication apparatus.

FIG. 3 is a diagram illustrating the functional block configuration of the AP 100 according to the present exemplary embodiment. Each of these functional blocks can be realized by the control unit 202 executing the program stored in the storage unit 201 by. For example, the control unit 202 realizes each function by controlling each hardware device and calculating and processing information according to the control program. A part or all of the functions illustrated in FIG. 3 may be realized by dedicated hardware, such as an application specific integrated circuit (ASIC).

A Wake-up frame priority determination unit 301 determines a priority of the Wake-up frame based on a predetermined condition. The details of the predetermined condition will be described below. An EDCA parameter setting unit 302 sets the EDCA parameter of the Wake-up frame, based on the priority determined by the Wake-up frame priority determination unit 301. A Basic Service Set (BSS) parameter acquisition unit 303 acquires BSS parameters in the PCR. The BSS parameters include, for example, the following parameters in the Beacon frame.

Channel Switch Announcement element
Extended Channel Switch Announcement element
Wide Bandwidth Channel Switch element
Operating Mode Notification element
EDCA parameter
High Throughput (HT) Operation element
Very High Throughput (VHT) Operation element, DHSS parameter set The BSS parameters may include a parameter other than the above listed parameters. A data buffer management unit 304 manages a buffer of data that is addressed to each STA and is held by the AP 100. The AP 100 should transmit the Wake-up frame to the STA 101 operating in the WUR mode and transmit data before the buffer overflows. In a case where the AP 100 regularly transmits the Wake-up frame, a Wake-up frame transmission interval acquisition unit 305 acquires a transmission interval of the regular transmission. The transmission interval of the Wake-up frame may be set to vary depending on the STA at the other end, the number of STAs, and/or an application in use. An STA-addressed data EDCA parameter acquisition unit 306 is a block that acquires the EDCA parameter of the data addressed to the STA.

FIG. 4 is a diagram illustrating examples of EDCA parameters held by the AP 100. EDCA is a method for controlling a priority that is defined in the IEEE 802.11e standard standardized for the purpose of providing the Quality of Service (QoS) functions in the IEEE 802.11 standards. In EDCA, packets received from an upper-level layer, such as an application, are classified into four access categories (hereinafter referred to as ACs) and stored into the respective queues. The four ACs are AC_Voice (VO), AC_Video (VI), AC_Background (BK), and AC_Best Effort (BE) in the descending order of the priority. The EDCA parameters used in wireless frame transmission are determined for each of the four ACs, and the difference in the priority of a transmission chance is determined based on these parameters. Each value of the EDCA parameters is determined and managed by the AP 100, and is notified to each STA by being contained in a Beacon frame of the PCR, a Probe response frame, or the like.

In the wireless LAN in compliance with the IEEE 802.11 standards, Carrier Sense Multiple Access with Collision Avoidance (CSMA/CA) is used as a method for controlling an access conflict in the wireless communication band. In CSMA/CA, an apparatus having a frame to transmit first attempts to sense a carrier, to check whether a wireless communication band (a frequency band) that the apparatus intends to use is currently in use. If the wireless communication band is not currently in use, the apparatus transmits the frame after waiting for the transmission for a determined waiting time called Distributed Inter Frame Space (DIFS) and the number of slots called a contention window. One slot is, for example, a unit such as 10 μs. Further, the size of the contention window is defined by two parameters, CWmin and CWmax.

In EDCA, the CSMA/CA procedure is performed independently for each AC, and an AC or a wireless LAN apparatus having a waiting time that becomes zero first will acquire a right to transmit a wireless frame. In EDCA, a parameter called Arbitration Inter Frame Space (AIFS) is set as the waiting time for each AC instead of the DIFS, and a smaller value is set for an AC corresponding to a higher priority. Similarly, CWmin and CWmax are also set to smaller values for an AC corresponding to a higher priority, and a packet of the high-priority AC is highly likely able to be prioritized to be transmitted.

In the present exemplary embodiment, the AP 100 manages and holds the EDCA parameters illustrated in FIG. 4. A parameter 401 illustrated in FIG. 4 is an Access Category Index (ACI) and indicates the identifier of an AC 402. Values of the EDCA parameters of each AC are set as illustrated in FIG. 4.

Next, the operation of the AP 100 according to the present exemplary embodiment will be described with reference to flowcharts illustrated in FIGS. 5 to 8. FIGS. 5 to 8 illustrate first to fourth examples of Wake-up frame transmission processing performed by the AP 100 according to the present exemplary embodiment. The processing illustrated in FIGS. 5 to 8 is started when there emerges some data that the AP 100 should transmit in the PCR mode to the STA 101 operating in the WUR mode. The control unit 202 executes the control program stored in the storage unit 201 and calculates and processes information and controls each hardware device, by which each step in the flowcharts illustrated in FIGS. 5 to 8 is realized. The flowchart illustrated in FIG. 5 indicates the first example of the Wake-up frame transmission processing performed by the AP 100. In FIG. 5, in step S501, the AP 100 determines whether the data targeted for the transmission in the PCR mode is data associated with a change in the BSS parameters. In other words, the AP 100 determines whether a change is made to the BSS parameters of the wireless LAN established by the AP 100 itself. The BSS parameters include the various kinds of parameters as described above. The BSS parameters include, for example, information about the frequency channel that is used in the PCR, and a delay in the notification of these kinds of information to the STA 101 undesirably makes it impossible for the STA 101 to access the AP 100.

Accordingly, the transmission of the BSS parameters according to a change in the BSS parameters is high-priority communication.

In a case where the AP 100 determines that a change is made to the BSS parameters as a result of the determination in step S501 (YES in step S501), the processing proceeds to step S502. In a case where no change is made to the BSS parameters (NO in step S501), the processing proceeds to step S504. In a case where no change is made to the BSS parameters (NO in step S501), in step S504, the AP 100 sets the EDCA parameter of the Wake-up frame to the default value, and transmits it. The default value of the EDCA parameter of the Wake-up frame is assumed to be ACI=0, i.e., AC_BE (Best Effort) to which the lowest priority is assigned in the present exemplary embodiment, but may be another value. However, setting the ACI to which the lowest priority is assigned as the default brings about an advantage of reducing the number of times of depriving another STA operating in the Wake-up mode of a communication chance.

In step S502, the AP 100 checks the EDCA parameters that is used in wireless frames transmitted from the STAs 102 and 103 operating in the Wake-up mode. The AP 100 refers to the QoS Control Field in the frame transmitted from each of the STAs 102 and 103 operating in the Wake-up mode, acquires the EDCA parameter in this frame, and stores it into the storage unit 201 in advance. In step S502, the AP 100 checks the EDCA parameter that is used by another STA, by referring to the stored information. However, these pieces of information are not stored, for example, if no frame is transmitted from another STA in advance or another STA does not use EDCA. In such a case, the AP 100 may skip the processing in step S502.

Next, in step S503, the AP 100 determines the EDCA parameter of the Wake-up frame to be transmitted from now based on the EDCA parameter checked in step S502. More specifically, the AP 100 determines the EDCA parameter to use an EDCA parameter corresponding to a higher priority than the EDCA parameter checked in step S502. For example, in a case where the EDCA parameter used by another STA is AC_BK (Background), the AP 100 determines to use AC_VI (Video) or AC_VO (Voice) corresponding to a higher priority than that. In a case where a plurality of EDCA parameters is stored in step S502, the AP 100 identifies the EDCA parameter corresponding to the highest priority among the stored EDCA parameters. Then, the AP 100 determines to use the EDCA parameter corresponding to a higher priority than the identified EDCA parameter as the EDCA parameter of the Wake-up frame. After that, in step S504, the AP 100 sets the EDCA parameter determined in step S503 to the Wake-up frame, and transmits the Wake-up frame to the STA 101 operating in the WUR mode.

Performing this processing allows the AP 100 to prioritize the transmission of the Wake-up frame in a case where the data that should be prioritized to be transmitted to the STA 101 like the notification indicating a change in the BSS parameters is transmitted. As a result, the AP 100 can cause the STA 101 operating in the WUR mode to transition to the Wake-up mode without delay, whereby the STA 101 can reliably receive the high-priority data. The present flowchart has been described taking a case where high-priority data is the data associated with a change in the BSS, as an example thereof, but the high-priority data is not limited thereto and may be other data.

FIG. 6 is the flowchart illustrating the second example of the Wake-up frame transmission processing that is performed by the AP 100. In FIG. 6, in step S601, the AP 100 determines whether the transmission interval of the Wake-up frame is a preset predetermined threshold value or longer. In a case where the transmission interval of the Wake-up frame is the predetermined threshold value or longer (YES in step S601), the processing proceeds to step S602. If not (NO in step S601), the processing proceeds to step S604. In a case where the transmission interval of the Wake-up frame is the predetermined threshold value or longer, the Wake-up frame is less frequently transmitted and thus it can be determined that the communication band is not occupied even in a case where the priority of the EDCA parameter of the Wake-up frame increases. Accordingly, the AP 100 performs the processing in step S602 and steps subsequent thereto to increase the priority of the EDCA parameter of the Wake-up frame. Meanwhile, in a case where the transmission interval of the Wake-up frame is shorter than the predetermined threshold value, i.e., the Wake-up frame is frequently transmitted, increasing the priority of the EDCA parameter of the Wake-up frame undesirably leads to insufficiency of the communication band. Accordingly, in this case, the AP 100 transmits the Wake-up frame with the default value kept set thereto without increasing the priority of the EDCA parameter of the Wake-up frame. Processing from steps S602 to S604 is similar to the processing from steps S502 to S504 illustrated in FIG. 5, and therefore the description thereof will be omitted here.

Performing the above-described processing allows the AP 100 to prioritize the transmission of the Wake-up frame over the transmission frame of another STA by increasing the priority of the EDCA parameter of the Wake-up frame within a range not significantly affecting the communication band.

FIG. 7 is the flowchart illustrating the third example of the Wake-up frame transmission processing performed by the AP 100. In FIG. 7, in step S701, the AP 100 determines whether the free space of the transmission buffer storing therein the data to be transmitted to the STA 101 targeted for Wake-up is a preset predetermined threshold value or smaller. In a case where the free space is the predetermined threshold value or smaller as a result of the determination (YES in step S701), the processing proceeds to step S702. If not (NO in step S701), the processing proceeds to step S704. In a case where the free space of the transmission buffer is the predetermined threshold value or smaller, the buffer may overflow unless the AP 100 immediately causes the STA 101, to which the data is addressed, to transition to the Wake-up mode and transmits the data in the PCR. Thus, it can be determined that the transmission of the Wake-up frame should be prioritized over a signal to be transmitted with respect to another STA. Consequently, the AP 100 performs the processing in step S702 and steps subsequent thereto to increase the priority of the EDCA parameter of the Wake-up frame. Meanwhile, in a case where the free space of the transmission buffer is larger than the predetermined threshold value, it can be determined that the transmission of the Wake-up frame does not have to be prioritized, and thus the AP 100 transmits the data using the default EDCA parameter. Processing from steps S702 to S704 is similar to the processing from steps S502 to S504 illustrated in FIG. 5, and therefore the description thereof will be omitted here.

Performing the above-described processing allows the AP 100 to prioritize the transmission of the data over the transmission frame of another STA by increasing the priority of the EDCA parameter of the Wake-up frame, to prevent the buffer overflow in the AP 100.

In the above-described manner, the Wake-up frame transmission processing illustrated in FIGS. 5 to 7 is specific examples of the processing in which the AP 100 determines that the transmission of the Wake-up frame should be prioritized and determines the EDCA parameter of the Wake-up frame based on the determination.

The processing illustrated in FIGS. 5 to 7 can be modified in various manners. For example, in step S503, in a case where the EDCA parameter checked in step S502 is AC_VO (Voice), there is no EDCA parameter corresponding to a higher priority than that. Such a case can still be handled well by also setting the EDCA parameter of the Wake-up frame to AC_VO (Voice). Further, in step S503, the AP 100 operates to use the EDCA parameter corresponding to a higher priority than the EDCA parameter checked in step S502, but may operate to use an EDCA parameter corresponding to the same priority as the EDCA parameter checked in step S502. Alternatively, the AP 100 may operate to use AC_VO (Voice), which is invariably the highest priority as the EDC parameter, in step S503, while omitting the processing in step S502, i.e., regardless of another STA. Alternatively, the AP 100 may determine the EDCA parameter corresponding to the high priority by changing the Arbitration Inter Frame Space Number (AIFSN) or CWmin and CWmax while keeping AC set to the default value when determining the EDCA parameter.

FIG. 8 is the flowchart illustrating the fourth example of the Wake-up frame transmission processing performed by the AP 100. In FIG. 8, in step S801, the AP 100 acquires the EDCA parameter of the transmission data addressed to the STA 101 targeted for Wake-up. Then, in step S802, the AP 100 determines to set the EDCA parameter of the Wake-up frame to the same value as the EDCA parameter acquired in step S801. After that, in step S803, the AP 100 transmits the Wake-up frame using the determined EDCA parameter. More specifically, in a case where the EDCA parameter of the transmission data addressed to the STA 101 is AC_VI (Video), the AP 100 also sets the EDCA parameter of the Wake-up frame to AC_VI (Video). In a case where the EDCA parameter of the transmission data addressed to the STA 101 is AC_VO (Video), the AP 100 also sets the EDCA parameter of the Wake-up frame to AC_VO (Voice).

In a case where the transmission data addressed to the STA 101 is data not using EDCA, the AP 100 employs the default value as the EDCA parameter of the Wake-up frame.

Performing the above-described processing allows the AP 100 to set the priority of the Wake-up frame in conformity in accordance with the priority of the data to be transmitted to the STA 101 in the PCR. Accordingly, in a case where the transmission data is high-priority data, the AP 100 can automatically increase the priority of the Wake-up frame.

In the above-described manner, the Wake-up frame transmission processing according to the present exemplary embodiment allows the AP 100 to cause the STA 101 operating in the WUR mode to transition to the Wake-up mode at a further appropriate timing.

The above-described exemplary embodiment is merely an example, and the present invention is not limited to this exemplary embodiment. For example, the Wake-up mode and the WUR mode are examples of an operation mode in which data can be received using a part of wireless communication units among a plurality of wireless communication units and an operation mode using another wireless communication unit operable with lower power consumption than the former operation mode, respectively. The communication apparatus may be operable in an operation mode other than these operation modes. The Wake-up frame in compliance with the IEEE 802.11ba standards is an example of a request signal for issuing an instruction for a transition of the operation mode. CSMA/CA defined in the IEEE 802.11 standards is an example of a method for controlling an access conflict in a wireless communication band, and the EDCA parameter is an example of a parameter that is used to avoid the access conflict in the wireless communication band.

The above-described flowcharts illustrated in FIGS. 5 to 8 can be appropriately combined and performed. More specifically, the AP 100 may appropriately combine the determination processing and the like in steps S501, S601, S701, and S801 and perform them, and determine the EDCA parameter of the Wake-up frame based on the result of the determination. The AP 100 may be configured to allow the user to issue an instruction about which processing is performed among them via the output unit 205, the input unit 204, and/or the like.

Other Exemplary Embodiments

The present invention can also be realized by processing that supplies a program capable of fulfilling one or more functions of the above-described exemplary embodiment to a system or an apparatus via a network or a storage medium, and causes one or more processors in a computer of this system or apparatus to read out and execute the program. Alternatively, the present invention can also be realized by a circuit (for example, an ASIC) capable of fulfilling one or more functions.

The present invention shall not be limited to the above-described exemplary embodiment, and can be changed and modified in various manners without departing from the spirit and the scope of the present invention. Therefore, the following claims will be appended to make the scope of the present invention publicly known.

According to the present invention, a signal for causing a communication apparatus to transition to a state for receiving data can be transmitted at a further appropriate timing.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A communication apparatus comprising:
   at least one memory that stores instructions; and
   at least one processor that executes the instructions, the instructions, when executed, causing the communication apparatus to perform operations comprising:
   setting a transmission interval of a WUR (Wake-UP Radio) frame;
   attempting a process for transmitting the WUR frame periodically based on the set transmission interval to an apparatus operating in a second operation mode among a plurality of operation modes including a first operation mode and the second operation mode, the first operation mode using a first wireless communication interface, the second operation mode not using the first wireless communication interface and using a second wireless communication interface operable with lower power consumption than the first wireless communication interface, the WUR frame causing the apparatus to transition from the second operation mode to the first operation mode;
   determining whether transmitting a request signal is prioritized based on whether the set transmission interval is equal to or longer than a predetermined value; and
   deciding a parameter in the request signal, based on a result of the determination, the parameter being used to avoid an access conflict in a wireless communication band,
   wherein the WUR frame is transmitted when a transmission opportunity is acquired by the communication apparatus based on the decided parameter.

2. The communication apparatus according to claim 1, wherein the communication apparatus is an access point of a wireless LAN in compliance with the Institute of Electrical and Electronics Engineers (IEEE) 802.11 standards.

3. The communication apparatus according to claim 1, wherein the WUR frame is a frame of the IEEE 802.11ba standards, and another frame transmitted via the first wireless communication interface is a frame of a different type from the WUR frame of the 802.11ba and that conforms to the IEEE802.11 series of standards.

4. The communication apparatus according to claim 1, wherein the decided parameter is an Enhanced Distributed Channel Access (EDCA) parameter.

5. A communication method comprising:
   setting a transmission interval of a WUR (Wake-UP Radio) frame;
   attempting a process for transmitting the WUR frame periodically based on the set transmission interval to an apparatus operating in a second operation mode among a plurality of operation modes including a first operation mode and the second operation mode, the first operation mode using a first wireless communication interface, the second operation mode not using the first wireless communication interface and using a second wireless communication interface operable with lower power consumption than the first wireless communication interface, the WUR frame causing the apparatus to transition from the second operation mode to the first operation mode;
   determining whether transmitting a request signal is prioritized based on whether the set transmission interval is equal to or longer than a predetermined value; and
   deciding a parameter in the request signal, based on a result of the determining, the parameter being used to avoid an access conflict in a wireless communication band,
   wherein the WUR frame is transmitted when a transmission opportunity is acquired by the communication apparatus based on the decided parameter.

6. A non-transitory computer-readable storage medium storing a program for causing a computer to operate as the communication apparatus according to claim 1.

* * * * *